Patented Nov. 22, 1927.

1,650,036

UNITED STATES PATENT OFFICE.

MAX PHILLIPS, OF EVANSVILLE, WISCONSIN.

CYCLOHEXYL RESORCIN AND PROCESS OF MAKING THE SAME.

No Drawing.    Application filed April 28, 1926. Serial No. 105,264.

The invention relates to the preparation of a new derivative of resorcin having useful medicinal properties.

It is already known that alkyl derivatives of resorcin have germicidal properties, the germicidal effect increasing with the size of the alkyl group and reaching a maximum with the normal six carbon chain or the N. hexyl group. A normal hexyl derivative of resorcin under the name "hexyl resorcin" or "Caprokol" has found wide use, particularly as a urinary antiseptic. The chief objection to the hexyl resorcin from a chemical standpoint is that one of the raw materials, namely, N-hexyl alcohol is not commercially available, so that the price of the final product is comparatively high.

I have found that if any derivative of cyclohexane, such as cyclohexanol (hexahydrophenol) or chlorcyclohexane is condensed with resorcin in the presence of a suitable dehydrating or condensing agent a cyclohexyl resorcin is obtained. This product has a phenol coefficient which compares very favorably with the published data on hexylresorcin, and has the further advantage that the raw materials, namely, cyclohexanol and resorcin are cheap and readily obtainable. The cyclohexanol is obtained commercially by the catalytic hydrogenation of phenol.

An example of the manner in which I proceed with the preparation of cyclohexyl resorcin is the following, without limiting myself as to any particular temperature or condensing agent:

Ten pts. cyclohexanol, 22 pts. resorcin and 3.5 pts. anhyd. $ZnCl_2$ are placed in a suitable vessel and heated until the reaction begins, which is approximately 150° C. Heating is continued until there is no further reaction. The reaction product is thoroughly washed with $H_2O$ and product distilled under reduced pressure. The fraction boiling 165–185° C. at 2 mm. pressure is retained. This is a nearly colorless liquid which solidifies at room temperature, and when crystallized from a suitable solvent, such as benzol or a mixture of benzol and petroleum ether, the cyclohexyl resorcin is obtained as colorless plates melting at 124° C. (corrected).

Whereas in the above example cyclohexanol was condensed with resorcin, other derivatives of cyclohexane, such as chlor, brom or iodocyclohexane, may be used in place of the cyclohexanol. When the halogen derivatives of cyclohexane are used it is desirable to use 2 mols. resorcin to one mol. of the cyclohexane derivative.

Whereas in the above example anhyd. $ZnCl_2$ was used as the condensing agent, other condensing agents, such as $Al_2Cl_6$, $H_2SO_4$, anhyd. $FeCl_2$, etc., may be used instead, although I prefer to use anhyd. $ZnCl_2$.

The term "derivative of cyclohexane" as used in the specification and the claims is intended to include in its definition substitution products of cyclohexane, where one or more hydrogen atoms have been replaced by chlorine, bromine, iodine, hydroxyl, alkoxyl, alkyl, aryl and aryl-alkyl group or groups.

Having now described my invention, what I claim and desire to have protected by Letters Patent is:

1. A new chemical compound, cyclohexylresorcin.

2. A process of making cyclohexyl-resorcin consisting in the condensation of a negative substituted cyclohexane and resorcin.

3. A process of making cyclohexyl-resorcin consisting in the condensation of cyclohexanol and resorcin.

4. A process of making cyclohexyl-resorcin consisting in the condensation of a negative substituted cyclohexane and resorcin in the presence of a condensing agent.

5. A process of making cyclohexyl resorcin consisting in the condensation of cyclohexanol and resorcin in the presence of a condensing agent.

6. A process of making cyclohexyl resorcin consisting in the condensation of a negative substituted cyclohexane and resorcin in the presence of anhyd. zinc chloride.

7. A process of making cyclohexyl resorcin consisting in the condensation of cyclohexanol and resorcin in the presence of anhyd. zinc chloride.

MAX PHILLIPS.